Sept. 8, 1970 E. H. YOUNG, JR 3,527,958

ULTRASONIC DELAY LINE MEMORY

Filed Feb. 16, 1968

3 Sheets-Sheet 1

INVENTOR
E. H. YOUNG, JR.
BY Sylvan Sherman
ATTORNEY

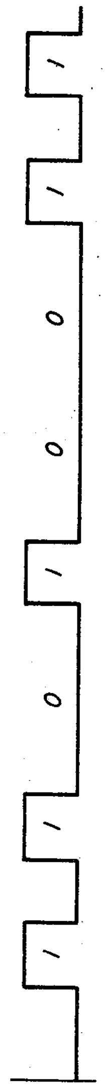
FIG. 4A INPUT TO DELAY LINE
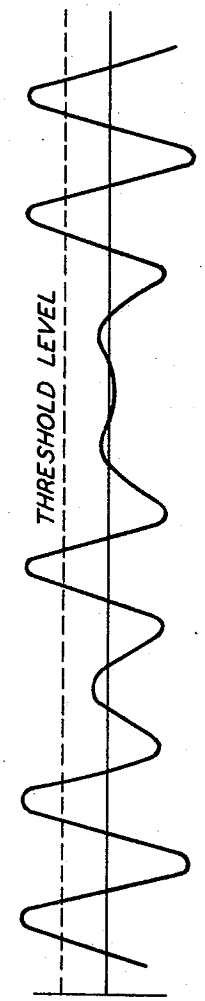
FIG. 4B OUTPUT OF DELAY LINE
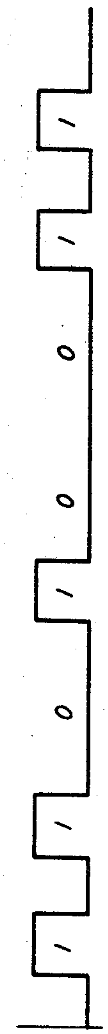
FIG. 4C OUTPUT OF REGENERATING CIRCUIT
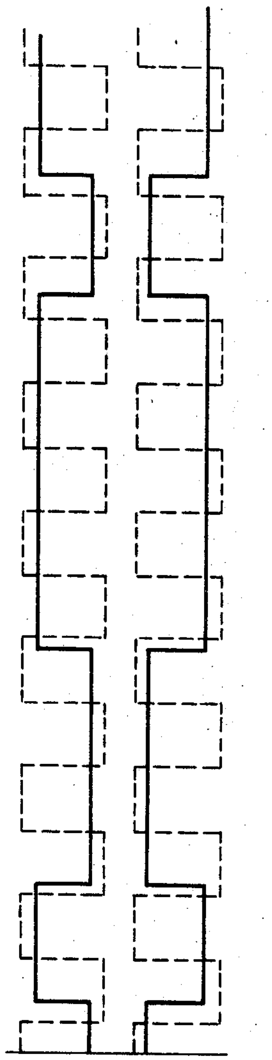
FIG. 4D NORMAL AND COMPLIMENTARY OUTPUTS OF PULSE COUNTER WITH CLOCK SIGNAL SHOWN SUPERIMPOSED
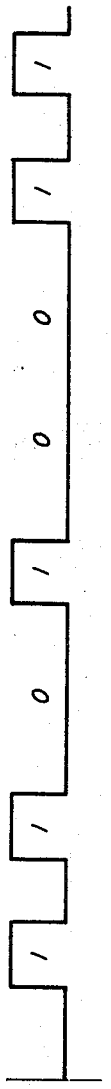
FIG. 4E OUTPUT OF SELECTION CIRCUIT United States Patent Office 3,527,958
Patented Sept. 8, 1970

3,527,958
ULTRASONIC DELAY LINE MEMORY

Ernst H. Young, Jr., Center Valley, Pa., assignor to Bell Telephone Laboratories, Incorporated, Murray Hill, N.J., a corporation of New York Filed Feb. 16, 1968, Ser. No. 705,973
Int. Cl. H03k *19/08*
U.S. Cl. 307—208 5 Claims

ABSTRACT OF THE DISCLOSURE

This application discloses an ultrasonic delay line memory for storing digital information using a retiming circuit having a circuit speed as low as that of the memory. More specifically, the retiming of a pulse sequence from the memory is accomplished by applying the sequence to a binary pulse counter which changes state for each input pulse and combining the normal and complementary outputs of the counter with a sequence of clocking pulses to produce an output comprising only the first clocking pulse following each change of state of the counter. Because this retiming circuit can use clocking pulses as wide as the memory pulses, a higher bit rate can be used in the memory, and greater economy can be realized.

This invention relates to an ultrasonic delay line memory having retiming circuitry which can operate at the same circuit speed as the delay line.

BACKGROUND OF THE INVENTION

Ultrasonic delay line memories are presently being used to store digital information in a number of electronic systems. Since signal pulses inserted into the input of an ultrasonic delay line arrive at the output in the same order they were put in, delay line memories are particularly advantageous for storing sequential digital information. Other advantages of such memories include low cost per bit, high bit rate and low weight and volume per bit.

A typical delay line memory comprises an ultrasonic delay line coupled to appropriate pulse regenerating and retiming circuitry. (For examples of typical delay line memories, see A. H. Meitzler, Ultrasonic Delay Lines Used To Store Digital Data, 42 Bell Laboratories Record 315, October 1964.) The arrangement is designed to permit insertion of a sequence of pulses into the delay line input, to store the pulses in the delay line and to regenerate and retime them at the output. The regenerated and retimed pulses can then be reinserted into the delay line input to produce a recirculating memory.

The retiming circuitry is necessary to correct for timing errors incurred by the sequence of pulses during transmission. Such factors as noise, circuit instability and intersymbol interference can either advance or retard the relative position of a pulse in the sequence. These timing errors can be corrected by synchronizing the sequence of regenerated pulses with an externally controlled clock signal.

In typical prior art retiming circuits, the regenerated pulse sequence is retimed by comparing it with a sequence of narrower clocking pulses having the same repetition rate as the bit rate of the memory. If a clocking pulse falls within a regenerated pulse, the regenerated pulse is retained in the output sequence and synchronized with the clocking pulse. If, to the contrary, no clocking pulse falls within the regenerated pulse, the regenerated pulse is lost. The clocking pulse is chosen to be sufficiently narrow that it will fall within a regenerated pulse subjected to the maximum timing error which can be expected to occur during a single cycle through the memory. Typically, the clock pulse is two to four times narrower than the regenerated pulse. In order to operate with these narrower pulses, the retiming circuitry must have a greater maximum bit rate (or circuit speed) than the memory.

These prior art retiming circuits, however, are not well adapted for economical use in delay line memory systems utilizing integrated circuits. In these systems it is desirable to employ associated circuitry which avoids operation with narrow pulses because of the difficulty in achieving integrated circuits useful at high circuit speeds. To this end, it is desirable to employ retiming techniques which do not impose stringent requirements on the narrowness of the retiming pulse. Specifically, there is desired a retiming technique which can employ wider clocking pulses than have been characteristic of prior art techniques.

SUMMARY OF THE INVENTION

According to the present invention, a more economical delay line memory is constructed by providing retiming circuitry which can operate at a circuit speed as low as that of the delay line. In particular, the retiming of the regenerated pulse sequence is accomplished by converting it into a hybrid sequence which changes between 0 and 1 for each pulse and combining this sequence with a sequence of clock pulses to produce an output comprising only the first clock pulse following each change of the hybrid sequence.

BRIEF DESCRIPTION OF THE DRAWINGS

The advantages and features of the present invention will appear more fully upon consideration of the various illustrative embodiments now to be described in detail in connection with the accompanying drawings, in which:

FIGS. 4A, 4B, 4C, 4D and 4E, which are graphical illustrations useful for understanding operation of the invention, show a typical sequence of pulses as they appear at various points along the memory cycle.

DETAILED DESCRIPTION

Figure 1:
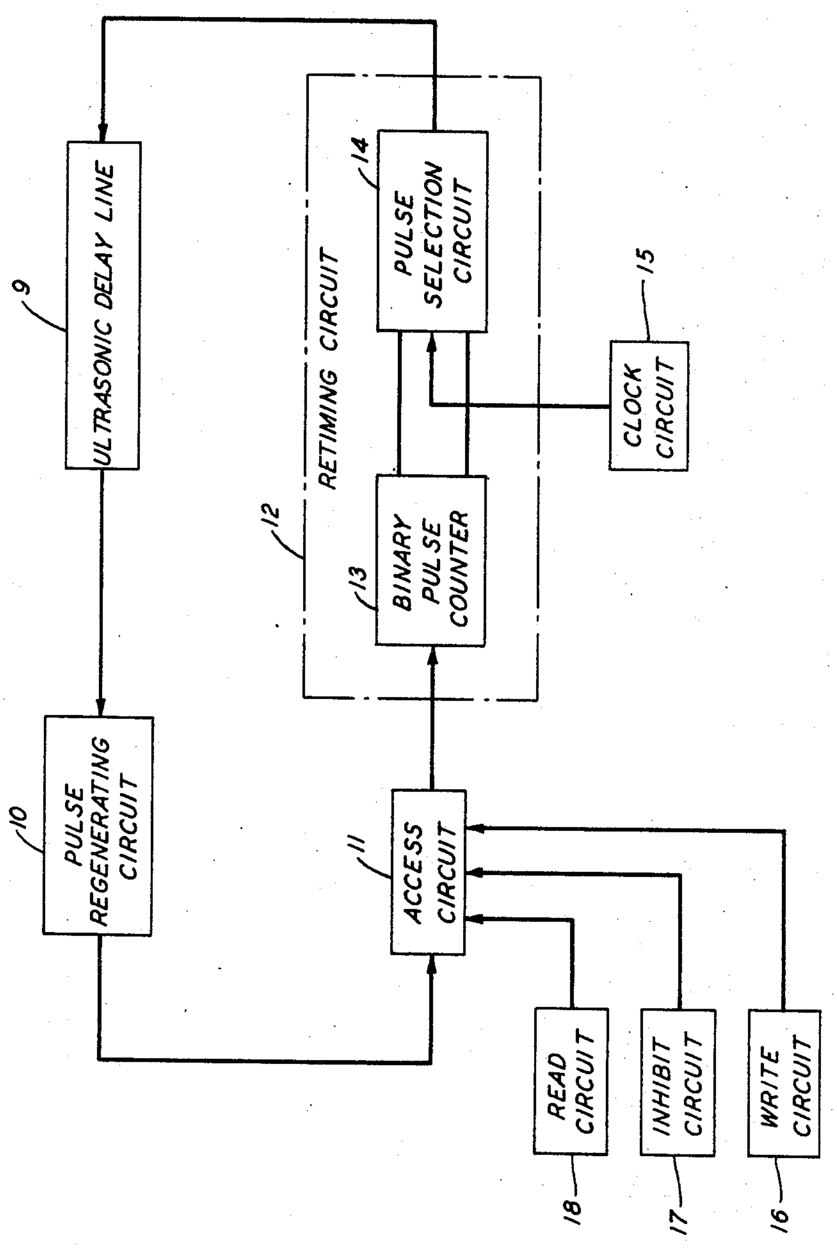
FIG. 1 shows in block schematic form an illustrative embodiment of an ultrasonic delay line memory in accordance with the invention.

In FIG. 1 there is shown an ultrasonic delay line memory in accordance with the invention comprising, in essence, an ultrasonic delay line 9, an appropriate pulse regenerating circuit 10, an access circuit 11 and a retiming circuit 12.

Ultrasonic delay line 9 can be any one of the variety of delay lines known to be suitable for storing high frequency digital signals. (For examples of suitable delay lines see J. H. Eveleth, A Survey of Ultrasonic Delay Lines Operating Below 100 mc./s, 53 Proc. IEEE 1406, 1965). Advantageously, the delay line is relatively low-loss and temperature stable. A delay line using sodium-potassium niobate transducers and a zero temperature coefficient glass delay medium has been found to be advantageous.

For relatively low loss delay lines, i.e. having a loss below about 20 decibels, pulse regenerating circuit 10 comprises a threshold circuit to discriminate between logical 1's and 0's with a minimum probability of error. The choice of an appropriate threshold circuit can range from an elaborate (differential amplifier) to a simple OR gate. For delay lines having relatively high loss, the regenerating circuit can include an appropriate linear amplifier (not shown) between the delay line and the threshold circuit to provide the power gain needed to compensate for delay line loss.

Retiming circuit 12 comprises, in essence, a binary pulse counter 13, a clock circuit 15, and a pulse selection circuit 14 for selecting the first clock pulse following each change of state of binary counter 13.

Binary pulse counter 13 can be any one of the known counters having normal and complementary outputs which each change polarity once in response to each input pulse. One example of such a counter is the well-known J–K flip-flop. In its simplest known form, however, the counter can comprise only four NAND gates.

Clock circuit 15 comprises circuitry for providing a sequence of clock pulses having the same repetition rate as the bit rate of the memory. It can, for example, comprise a stable oscillator; and, if desired, it can be phase locked to the total delay of the line.

Pulse selection circuit 14 comprises a combination of logic gates adapted to select the first clock pulse following each change of state of binary counter 13.

Figure 2:
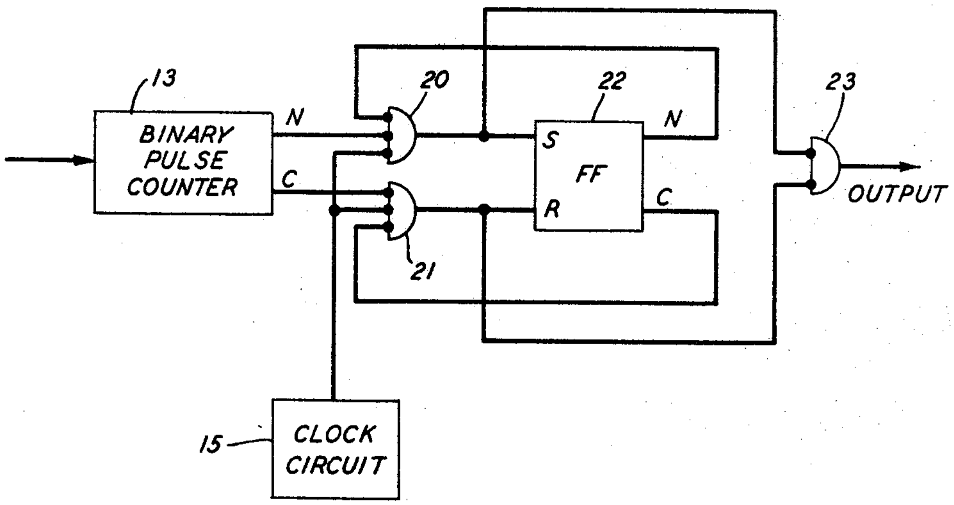
FIGS. 2 and 3 in block schematic form show illustrative embodiments of retiming circuits in accordance with the invention for use in the memory shown in FIG. 1.

FIG. 2 illustrates one example of a retiming circuit including a suitable pulse selection circuit. In this embodiment, the normal and complementary outputs of counter 13 are separately combined with the signal from clock circuit 15 in a pair of three-input NAND gates 20 and 21. The outputs of NAND gates 20 and 21 are connected to the set and reset terminals of a set-reset (S–R) flip-flop 22 which, as is known in the art, can be formed from a pair of NAND gates, and, in addition, are combined in a NAND gate 23. The normal and complementary outputs of flip-flop 22 are fed back to the inputs of NAND gates 20 and 21. When the propagation delay of each of the gates in the selection circuit is equal to a value which falls between ½ and ⅓ of a clock pulse width, the feedback from the first pulse in a sequence of pulses reaching one of NAND gates 20 or 21 turns off that gate until a pulse is passed by the other NAND gate. Under these conditions, the output of NAND gate 23 comprises the first clock pulse following each change of state of binary counter 13.

Figure 3:
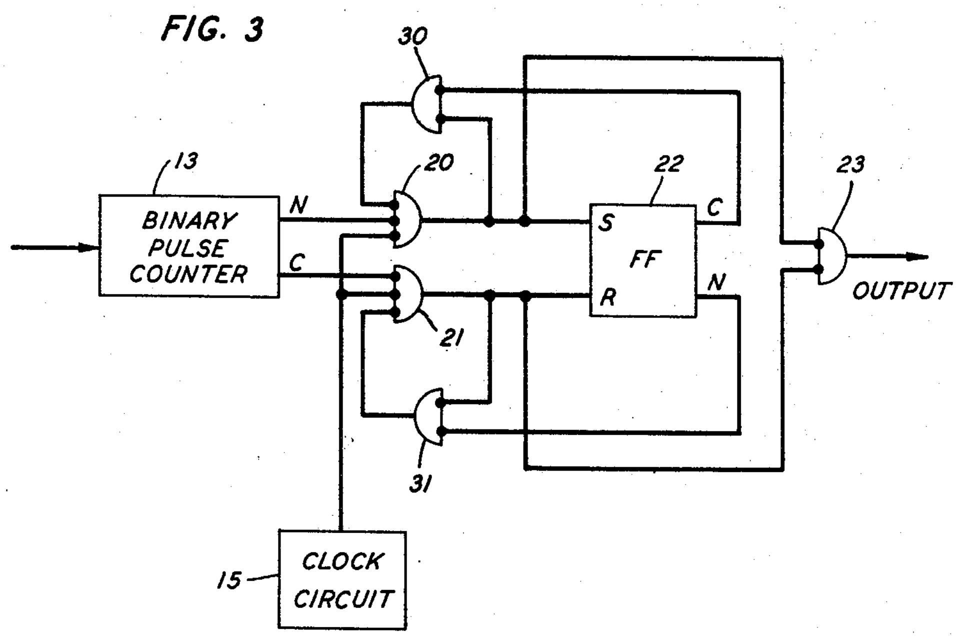

FIG. 3 illustrates a second example of a retiming circuit suitable for use in the invention. The retiming circuit of FIG. 3 is substantially the same as that shown in FIG. 2 except that a pair of additional NAND gates 30 and 31 have been added to permit the use of gates having propagation delays less than ⅓ of a clock pulse, and the polarity of the flip-flop output has been reversed. In particular, a pair of two-input NAND gates 30 and 31 are added in the feedback loops from flip-flop 22 to NAND gates 20 and 21. The output of three-input NAND gate 20 is combined with the complementary output of flip-flop 22 in two-input NAND gate 30, and the output of NAND gate 21 is combined with the normal output of the flip-flop in NAND gate 31. The outputs of two-input NAND gates 30 and 31 are fed back to the inputs of three-input NAND gates 20 and 21 respectfully. The addition of the two NAND gates 30 and 31 prevents the feedback from the flip-flop from shutting off three-input NAND gates 20 and 21 before a clock pulse has completely passed through these gates.

In addition to the pulse regenerating and retiming circuitry, an access circuitry 11 including a WRITE circuit 16, an INHIBIT circuit 17 and a READ circuit 18 can be placed in the loop at an appropriate points or points. Accessing is carried out in a conventional manner. Multiple input gates can be used at any convenient point for the WRITE and INHIBIT circuits, however, the INHIBIT circuit must always precede the WRITE circuit in the loop if INHIBIT and WRITE are to take place in the same cycle. The information stored can be read nondestructively at any point in the loop. Information can be read out in parallel up to as many bits as desired by inserting a shift register into the loop.

In operation, a signal containing information in the form of a sequence of pulses is inserted into the input of delay line 9. For example, FIG. 4A illustrates a typical portion of such an input sequence comprising, as shown, a binary 11010011 sequence. After passage of the delay time, the signal emerges from the output of the delay line as a sequence of sinusoids, such as that shown in FIG. 4B, typical of the pulse response of a linear phase, bell-shaped bandpass device.

The delay line output is coupled to pulse regenerating circuit 10 where it is amplified, if necessary, and restored to a sequence of pulses. As shown in FIG. 4C, the output of the regenerating circuit is a sequence of pulses substantially similar to the sequence inserted into the delay line except that timing errors incurred during the preceding cycle through the memory have not yet been corrected.

The sequence of pulses from the regenerating circuit is coupled to retiming circuit 12 where it is sychronized with the external clock signal from clock circuit 15 to eliminate timing errors.

The sequence of pulses is retimed by applying it to the input of binary counter 13, producing as is shown by the solid lines in FIG. 4D normal and complementary outputs which change polarity once in response to each input pulse, and combining these outputs with the sequence of clock pulses from clock circuit 15 in selection circuit 14, shown by the broken lines. The output of the selection circuit, as previously described, is the first clock pulse following each change of state of counter 13. This output corresponds to the sequence of pulses inserted into delay line 9 with timing errors removed. It can be reapplied to the delay line in order to repeat the cycle.

The advantage of this kind of delay line memory, as previously indicated, is that the retiming circuitry can operate at a circuit speed, as low as that of the delay line. As can be seen from FIG. 4D, the output signals from the pulse counter have at least twice the width of an input pulse. Hence binary signal pulses subject to a maximum timing error of less than 25 percent of a pulse width can be retimed by a retiming circuit using a clocking pulse of the same width as the signal pulse. By using a narrower clocking pulse width, even greater tolerances can be achieved. In general, the maximum timing error should be less than one-half the difference between the width of a regenerated pulse and that of a clocking pulse.

The above-described illustrative embodiments are susceptible of numerous and varied modifications, all clearly within the spirit and scope of the principles of the present invention, as will at once be apparent to those skilled in the art. No attempt has been made here to illustrate exhaustively all such possibilities.

For example, the retiming circuit described herein can be used as a retiming circuit in systems other than ultrasonic delay line memories, such as digital communications systems, in which a sequence of pulses is subjected to timing errors of various types.

What is claimed is:

1. A circuit for retiming a digital pulse signal comprising:

a binary pulse counter for receiving said digital signal having normal and complementary outputs;

a clock circuit for providing a sequence of clocking pulses at a repetition rate equal to the bit rate of said digital signal;

and a selection circuit for combining the output of said clock circuit with the outputs of said counter and producing a sequence of pulses made up of the seqeence of first clocking pulses following each change of state of said counter.

2. A circuit according to claim 1 wherein said selection circuit comprises;

a pair of three-input NAND gates for separately combining the output of said clock circuit with the normal and complementary outputs of said binary counter;

a set-reset flip-flop for combining the outputs of said pair of three-input NAND gates including feedback loops connecting the normal and complementary outputs of said flip-flop with the inputs of the NAND gates receiving the normal and complementary outputs of said counter, respectively;

and a two-input NAND gate for combining the outputs of said pair of three-input NAND gates for providing the sequence of pulses made up of the first clocking pulse following each change of state of said counter.

3. A circuit according to claim 2 wherein said flip-flop comprises a pair of two-input NAND gates and the propagation delay of every gate in said selection circuit is equal to a value which falls between ½ and ⅓ of a clocking pulse width.

4. A circuit according to claim 1 wherein said selection circuit comprises:

a pair of three-input NAND gates for separately combing the output of said clock circuit with the normal and complementary outputs of said binary counter;

a set-reset flip-flop for combining the outputs of said pair of NAND gates;

a pair of two-input NAND gates for combining the normal and complementary outputs of said flip-flop with the outputs of the three-input NAND gates receiving the complementary and normal outputs of said counter, including feedback loops from the output of said two-input NAND gates to the associated three-input NAND gates;

and a two-input NAND gate for combining the outputs of said pair of three-input NAND gates.

5. A circuit according to claim 4 wherein said flip-flop comprises a pair of two terminal NAND gates and the propagation delay of every gate in said selection circuit is equal to a value which is less than ½ a clocking pulse width.

References Cited

UNITED STATES PATENTS

| | | | |
|---|---|---|---|
| 3,258,696 | 6/1966 | Heyman | 328—48 X |
| 3,299,285 | 1/1967 | Cannon | 307—208 X |
| 3,458,825 | 7/1969 | Lagemann | 307—247 X |

DONALD D. FORRER, Primary Examiner

R. C. WOODBRIDGE, Assistant Examiner

U.S. Cl. X.R.

307—215, 224, 247, 291; 328—63, 72